Figure 1:
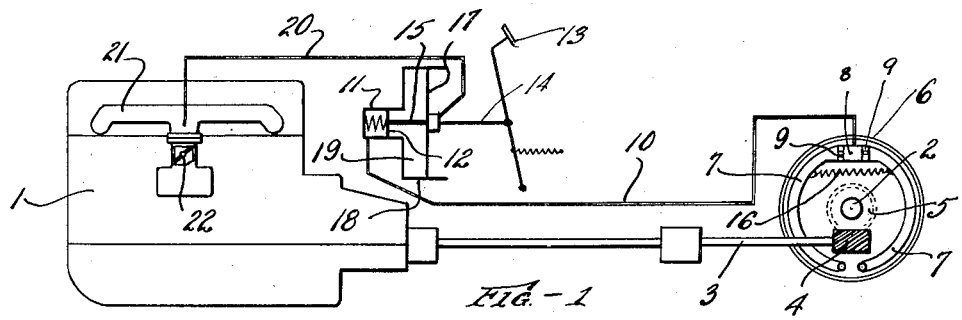

Sept. 13, 1932.                W. A. EATON                1,876,882

FLUID ACTUATED BRAKE

Filed March 16, 1929

INVENTOR

WILFRED A. EATON

BY Brockett, Hyde, Hygley & Meyer

ATTORNEYS

Patented Sept. 13, 1932

1,876,882

UNITED STATES PATENT OFFICE

WILFRED A. EATON, OF CLEVELAND, OHIO

FLUID ACTUATED BRAKE          REISSUED

Application filed March 16, 1929. Serial No. 347,678.

This invention relates to braking systems for automotive vehicles and the like, and more particularly the invention pertains to the application of so-called booster devices, utilizing negative fluid pressures as set up by the vehicle engine acting as a pump, to braking systems in which liquid is employed for transmission of the braking effort.

The type of braking system to which reference is had is generally known as "hydraulic" and comprises a master cylinder having communication with a number of brake actuating cylinders; each actuating cylinder being associated with one brake, as one for each wheel of the vehicle, all of the cylinders and the interconnections therebetween being completely filled with liquid, and the piston of the master cylinder being arranged for operator actuation as by a pedal, whereby depression of the pedal forces liquid from the master cylinder into all of the brake actuating cylinders to apply the brakes, the brakes thus being all applied with equal force due to the equalizing effect of the liquid.

My booster appliance is inserted in the braking system and to form a part thereof, between the pedal and the master cylinder, and utilizes the evacuating power of the engine inlet manifold to add operating force to the piston of the master cylinder, and is controlled by valve means in turn controlled by the usual manipulation of the pedal.

With such an arrangement, as with every booster arrangement it becomes important, and in fact essential to the most successful operation, that the operator be able to "feel" or sense the functioning of his brake in the same manner as is possible where no booster appliance is involved. To this end it is necessary that the required pressure upon the pedal be in a definite and fixed proportion to the resistance of the braking system to application of the brake.

It is an object of my invention to provide for this proportion by arranging a fluid differential between, on the one hand, the parts immediately affected by the vacuum employed, and on the other hand by the liquid pressure in the master cylinder. Since the liquid pressure is of much greater magnitude than that negative pressure possible in the vacuum cylinder, the result is that the required dimensions of the parts are decreased, so that a lighter and cheaper construction is possible. Also, as will appear, the construction is simpler and hence more sure of functioning than would otherwise be possible.

A further object of my invention is to employ an inexpensive and simple type of diaphragm valve, to employ diaphragm means for establishing the differential, and to combine in a single diaphragm the functions of valve and differential.

Figure 2:
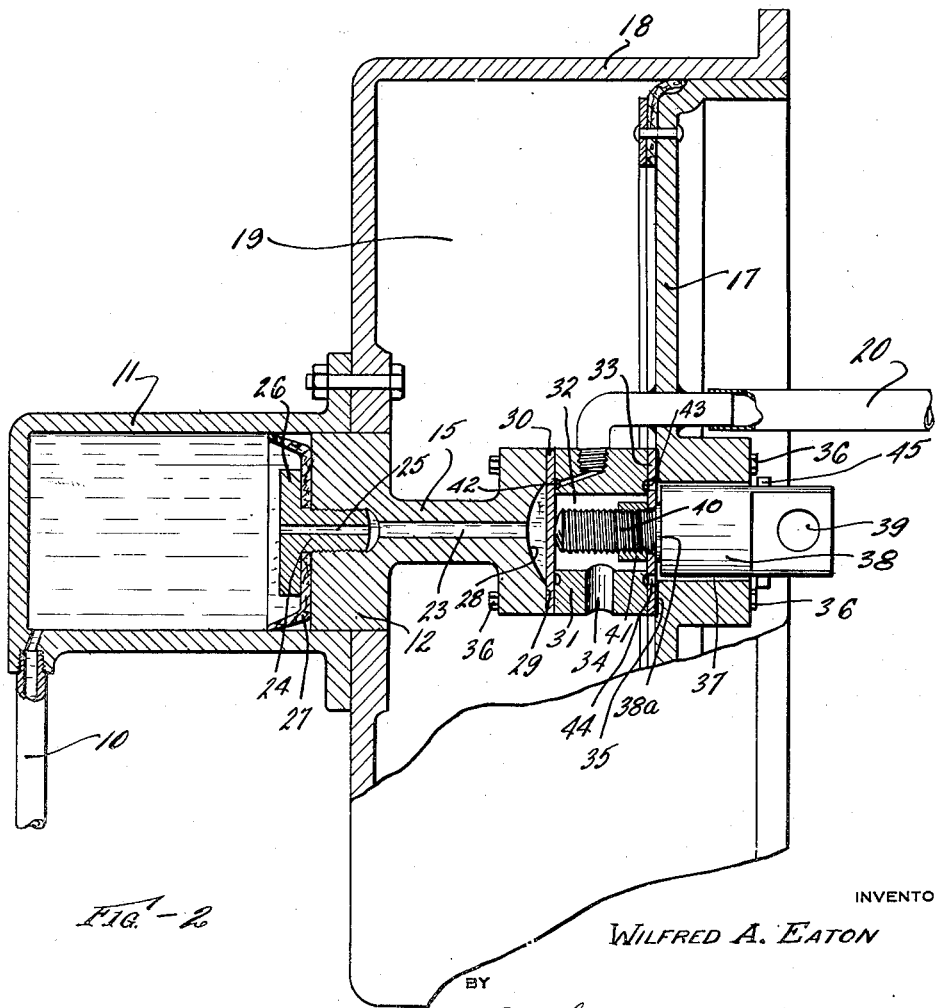

The exact nature of the invention together with further objects and advantages thereof will be apparent from the following description taken in connection with the accompanying drawing, in which Fig. 1 is a diagrammatic view showing pertinent parts of an internal combustion engine driven vehicle and particularly the braking system thereof, with my invention applied thereto; and Fig. 2 is an enlarged sectional detail illustrative more or less conventionally of the embodiment of my invention indicated in Fig. 1.

With reference now to the drawing, and particularly to Fig. 1, 1 represents an internal combustion engine driving the vehicle axle 2 through suitable connection including the shaft 3, pinion 4 and gear 5. The axle 2 carries a brake drum 6 against which a pair of brake shoes 7 may be expanded by application of fluid pressure to the brake cylinder 8, which is shown as having a pair of pistons 9, one for each brake shoe 7.

Pressure is applied to the cylinder 8 through the line 10 which, it will be understood, may have connection with other brake cylinders, as one for each wheel of the vehicle which is provided with a brake drum.

Pressure is applied to line 10 from a master cylinder 11 having a piston 12 arranged for actuation by the pedal 13 through the link 14 and piston rod 15.

What has thus far been described is old and well known in the art. The system including the master cylinder 11, line 10 and brake cylinders 8 being completely filled with liquid, depression of the pedal 13 will effect application of all of the brakes, liquid being forced from the master cylinder through the line 10 to the brake cylinders for the purpose. Likewise, release of the pedal 13 will allow the springs 16 to withdraw the brake shoes 7 from their brake drums and return the liquid along the line 10.

According to my invention I provide means for automatically adding to the force applied to the piston 12 to boost the force of the pedal 13 dependent thereon. To this end I associate with the piston rod 15 a piston 17 movable in a cylinder 18 which cylinder is fixed with the frame of the vehicle. The arrangement is such that the cylinders 11 and 18, and pistons 12 and 17 form an expansible chamber 19 of differential nature. I provide means under operator control for evacuating this chamber and including a line 20 leading from the inlet manifold 21 of the engine 1 to the chamber 19. The manifold 21 is provided with the usual throttle valve means 22.

With reference now to Fig. 2, the piston rod 15 is generally cylindrical with a central through passage 23. The rod at one end has screw-threaded thereinto a plug 24 with an opening 25 communicating with the passage 23 and a head 26 whereby the packing 27 is maintained in place. The opposite end of the rod 15 has a depression 28 with an annular flat face 29 thereabout. Against this face is positioned a diaphragm 30. Against the diaphragm 30 is a generally cylindrical member 31 having a large central through opening 32 and a radial opening 34 communicating therewith and with the chamber 19.

Against the opposite face of the member 31 seats a diaphragm 33. Seating about the diaphragm 33 is a circular washer 35 against which washer seats the body member of the piston 17 as indicated. Bolts 36 are turned into the rod 15 and pass through the diaphragm 30, member 31 diaphragm 33, washer 35 and piston 17, whereby these main parts are maintained in assembled relation.

The piston 17 has central through opening 37 to receive with a loose fit a member 38 having connection with the link 14 as by a pin passing through the opening 39. The member 38 has a threaded extension 40 passing through the diaphragm 33 and into the opening 32. The end of the extension 40 is adjacent the diaphragm 30 and a nut 41 is turned onto the extension to secure the diaphragm 33 against a shoulder 38a on the member 38, which shoulder is of a diameter smaller than that of the opening 32.

The face of the member 31 against which the diaphragm 30 bears has an annular recess 42 which is in connection by the pipe 20 with the source of vacuum. The opposite face of the member 31 also has an annular recess 43 and the diaphragm 33 has perforations 44 overlying the recess 43 and within the washer 35.

Thus movement of the member 38 to the left Fig. 2, will cause the extension 40 to raise the diaphragm 30 from its seat against the member 31 which allows air to be induced from the chamber 19 by way of the openings 34, 32, annular recess 42 and pipe 20; and this without unseating the diaphragm 33 from the member 31, so that no air inlet is had past this diaphragm. Similarly, movement to the right of the member 38 allows the diaphragm 30 to seat and unseats the diaphragm 33 allowing air to enter the chamber 19 by way of the opening 37, openings 44, and between the diaphragm 33 and the member 31.

Thus depression of the pedal 13 effects evacuation of the chamber 19. Evacuation of this chamber causes movement of the pistons 12 and 17 to the left Fig. 2, owing to atmospheric pressure. Such movement of the piston 12 applies the brakes. As the brakes are applied, however, pressure within the cylinder 11 rises and this pressure is effective by virtue of the passage 23, against the diaphragm 30 tending to seat the same upon the member 31 and thus cut the chamber 19 off from the source of vacuum. The movement of the member 38 and thus of the pedal 13 will hence cause application of the brake in an amount proportional to the force with which the pedal 13 is depressed, this force being always opposed by the liquid pressure against the diaphragm 30, so that the operator feels the brakes in the same manner that he would were not my device a part of the system; application of the brake by the power of the vacuum being a direct function of the force with which the pedal 13 is depressed. There is a slight lost motion between engagement of the extension 40 with the diaphragm 30, and engagement of the nut 41 with the diaphragm 33. Thus as the brakes are applied the diaphragm 33 is not affected except that the suction in the chamber 19 tends to seat it all the more securely upon the member 31 to cut off communication with the atmosphere, the diaphragm springing inwardly and maintaining its seat against the nut 41.

Release of the pedal 13 causes the member 38 to move to the right Fig. 2. This leaves the diaphragm 30 seated but unseats the diaphragm 33 and allows air to enter chamber 19 as described. This, of course, releases pressure upon the brakes as will be understood.

The member 38 is provided with a projection 45 adapted to engage the piston 17 should the vacuum fail. Upon such engagement a positive connection is had between the pedal 13 and the piston 12 through the member 31, and the brakes are thus instantly applicable in emergency by operator effort alone.

What I claim is:

1. In a braking system employing liquid for transmitting the brake-applying force, with a master cylinder having a piston movable therein for the purpose, a vacuum cylinder, a power piston movable in said vacuum cylinder, piston rod means connecting said pistons, valve means arranged for connecting a source of negative fluid pressure with the vacuum cylinder, operator-operated means for controlling said valve means, said master cylinder piston having an opening, and means associated with said opening for causing said valve means actuation to be opposed in amounts varying with the pressure of the liquid against said master cylinder piston.

2. In a braking system employing liquid for transmitting the brake-applying force, with a master cylinder having a piston movable therein for the purpose, a vacuum cylinder, a power piston movable in said vacuum cylinder, piston rod means connecting said pistons, valve means arranged for connecting a source of negative fluid pressure with the vacuum cylinder, operator-operated means for controlling said valve means, said piston rod means having a passage, said master cylinder piston having an opening communicating with said passage, and means associating said valve means with said passage to cause opening operation of the former to be opposed in amounts varying with the pressure of said liquid.

In testimony whereof I hereby affix my signature.

WILFRED A. EATON.